United States Patent
Matté et al.

[11] Patent Number: 5,537,833
[45] Date of Patent: Jul. 23, 1996

[54] SHIELDED CRYOGENIC TRAP

[75] Inventors: Stephen R. Matté, Norfolk; Bruce R. Andeen, Boxborough, both of Mass.

[73] Assignee: Helix Technology Corporation, Mansfield, Mass.

[21] Appl. No.: 434,343

[22] Filed: May 2, 1995

[51] Int. Cl.$^6$ .................................................... B01D 8/00
[52] U.S. Cl. ............................. 62/55.5; 62/268; 417/901
[58] Field of Search ..................... 62/55.5, 268; 417/901

[56] References Cited

U.S. PATENT DOCUMENTS

| | | | |
|---|---|---|---|
| 3,175,373 | 3/1965 | Holkeboer et al. | 62/208 |
| 3,232,031 | 2/1966 | Simons, Jr. | 55/269 |
| 3,296,810 | 1/1967 | Hablanian | 62/55.5 |
| 3,321,927 | 5/1967 | Hood, Jr. | 62/55.5 |
| 3,410,100 | 11/1968 | Carlson | 62/55.5 |
| 3,423,947 | 1/1969 | Moriya | 62/3 |
| 3,635,039 | 1/1972 | Power et al. | 62/55.5 |
| 3,785,162 | 1/1974 | Long et al. | 62/55.5 |
| 4,479,361 | 10/1984 | Osher | 62/55.5 |
| 4,530,213 | 7/1985 | Kadi | 62/55.5 |
| 4,815,303 | 3/1989 | Duza | 62/55.5 |
| 4,873,833 | 10/1989 | Pfeiffer et al. | 62/55.5 |
| 4,966,016 | 10/1990 | Bartlett | 62/55.5 |
| 4,979,369 | 12/1990 | Larin et al. | 62/55.5 |
| 5,062,271 | 11/1991 | Okumura et al. | 62/55.5 |
| 5,211,022 | 5/1993 | Bartlett et al. | 62/55.5 |
| 5,261,244 | 11/1993 | Lessard et al. | 62/55.5 |
| 5,465,584 | 11/1995 | Mattern-Klosson et al. | 62/55.5 |

OTHER PUBLICATIONS

O'Hanlon, John F., *A User's Guide to Vacuum Technology*, Second Edition, "Backstreaming, Baffles and Traps," 1989, pp. 203–207.

Cryo-Torr®500 High-Vacuum Pump, "Installation, Operation and Servicing Instructions," Mar. 1995, pp. B-2 and B-3.

"AP-8S Cryopump—Setting New Standards For Operational Reliability," brochure, Air Products and Chemicals, Inc., 1983, 4 pages.

Yokokura, Kenji, et al., JAERI Memo, "Improvements in the JFT-2 Vacuum System," Japan Atomic Energy Research Institute, Jul. 1980, 4 pages.

Yokokura, Kenji, et al., "Bakeable Cryopump for JFT2," 20th Joint Symposium on Vacuum Commemorating the 25th Anniversary of the Vacuum Society of Japan, 1979, 4 pages.

Holman, J. P., "Heat Transfer," Fourth Edition, 1963, pp. 300–301.

*Primary Examiner*—Christopher Kilner
*Attorney, Agent, or Firm*—Hamilton, Brook, Smith & Reynolds

[57] ABSTRACT

A cryogenic trap is shielded by a floating baffle array which is insulated from ambient temperature. The cryogenic trap includes a baffle array which is suspended by conductive braid from split cylinders. The split cylinders are cooled by respective closed cycle refrigerators.

16 Claims, 2 Drawing Sheets

SHIELDED CRYOGENIC TRAP

BACKGROUND

In high vacuum systems, there are many classes of vacuum pumps and the pumps are often connected in series. For example, a diffusion pump is used in cooperation with a roughing pump which permits the diffusion pump to operate at a very low pressure. In the diffusion pump, supersonic jets of oil vapor drive gas molecules away from a pumped chamber.

A disadvantage of diffusion pumps is that, in the molecular flow regime of very low pressures, there is oil backstreaming from the diffusion pump toward the pumped chamber. In the past, cryogenic cold traps comprising liquid nitrogen cooled baffles have been positioned between the pumped chamber and the diffusion pump. The cryotrap serves as a barrier to backstreaming oil and also serve as an efficient water pumping mechanism for pumping water vapor from the pumped chamber. The cryotrap may be supplemented with water cooled baffles interposed between the cryotrap and the warm diffusion pump to minimize the heat load to the nitrogen cooled trap and to serve as a first barrier to the backstreaming oil.

In recent years, cold traps cooled by closed cycle cryogenic refrigerators such as Gifford-McMahon cycle refrigerators have replaced conventional nitrogen cooled cold traps. Such traps typically serve as water pumps positioned between work chambers and primary pumps such as diffusion pumps and turbomolecular pumps.

SUMMARY OF THE INVENTION

The present invention relates to a novel cryogenic trap and its application. It is particularly applicable to a cryogenic trap cooled by a closed cycle cryogenic refrigerator and to a cryogenic trap positioned between a pumped chamber and a diffusion vacuum pump.

In accordance with one aspect of the invention, a cryotrap includes a cryogenically cooled array for trapping vapor passing from the pumped chamber to the vacuum pump. A passive shield is positioned between the cryogenically cooled array and the vacuum pump, the shield being insulated from ambient temperature such that its temperature floats between the temperatures of the cryogenically cooled array and of the vacuum pump. The shield is passive in that there is no active cooling, not even by cooling water. The shield thus presents a very simple yet effective mechanism for reducing heat flux to the cryogenically cooled array and for minimizing oil backstreaming from a diffusion pump. Since the shield floats to an intermediate temperature between the array and the diffusion pump, it can actually obtain lower temperatures, and thus provide more effective shielding and oil condensation, than would a water cooled baffle where the water is at ambient temperature.

In a high capacity system, both the cryogenic array and the shield take the form of optically dense chevron baffles. The chevron baffles may be supplemented by a cryogenically cooled cylinder.

In a system which faces an exceptionally high heat load, two closed cycle refrigerators may be used to cool the cryogenic array. In that case, the chevron baffles are preferably mounted to the respective refrigerators by metal braid. The metal braid provides a high conductance path yet relieves stress in the system with thermal contraction of the cooled elements. That contraction would otherwise stress the couplings to the oppositely positioned refrigerators and warp the baffles. Preferably, the chevron baffles are suspended by the braid from a pair of cylindrical elements which together form a split cylinder, each cylindrical element being mounted to a refrigerator.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
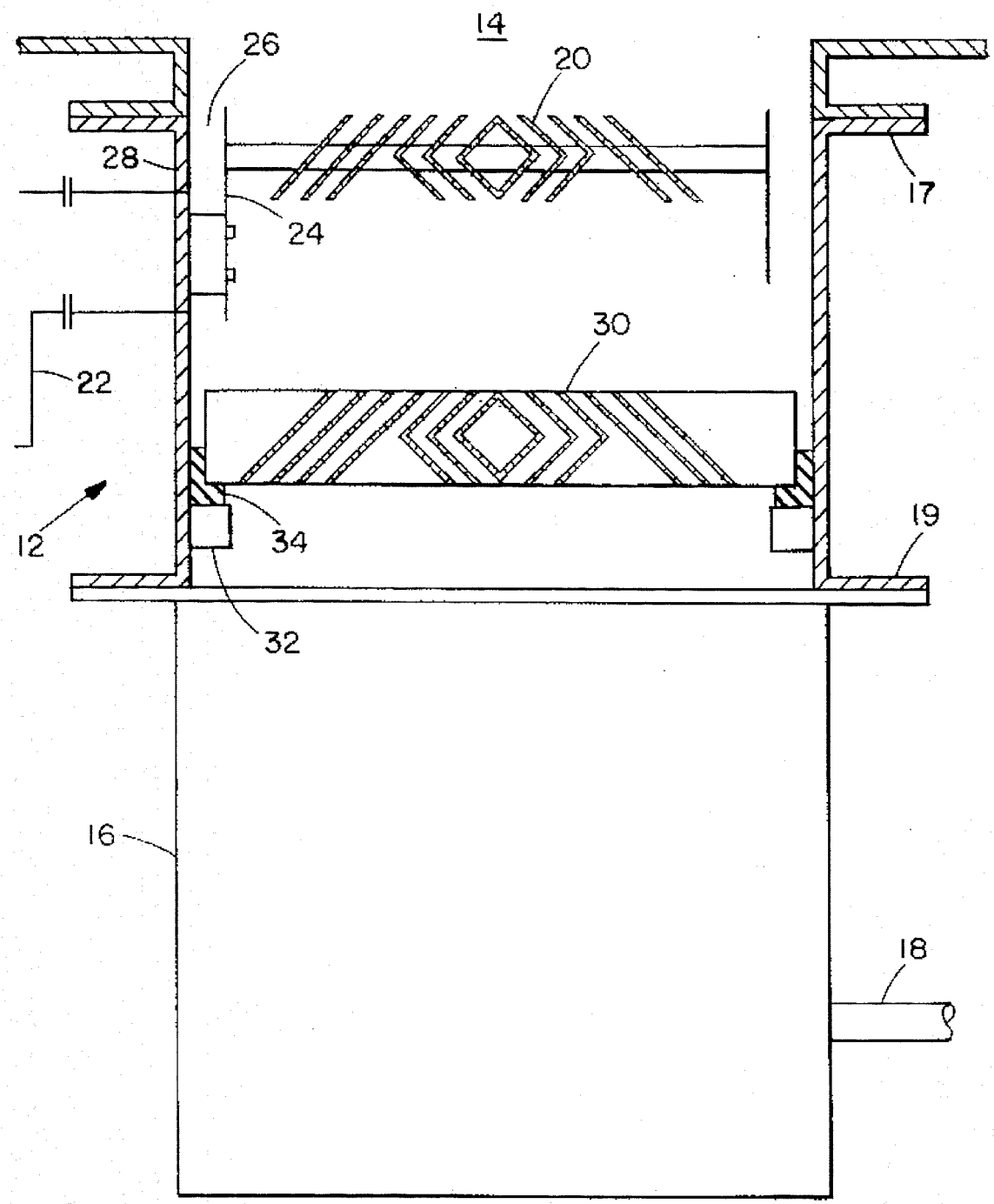
FIG. 1 is a cross sectional view of one embodiment of the invention.

FIG. 1 is a schematic illustration of a cryogenic trap 12 embodying the present invention positioned between a pumped chamber 14 and a diffusion pump 16. The diffusion pump includes a port 18 to a roughing pump. The cold trap is configured in a conduit 28 which may be attached by flanges 17 and 19 at each end thereof to the pumped chamber 14 and primary pump 16, respectively. Various modifications of the system, such as the inclusion of a gate valve between the cryogenic trap 12 and chamber 14 may also be made.

In this embodiment, the cryogenic trap includes a chevron array 20 which is cooled by a single closed cycle cryogenic refrigerator 22. The refrigerator 22 may, for example, be a CTI-Cryogenics Model 1050 single stage refrigerator. The array 20 is coupled to the refrigerator 22 through a cylinder 24 which provides additional cryogenic trapping surface. The cylinder 24 also provides a channel 26 between the cryogenic array 20 and the ambient temperature conduit 28. That channel has a high length to hydraulic diameter ratio to capture any oil which might otherwise backstream through the space between the array and the conduit 28.

The chevron array was selected to provide a high capture rate while minimizing the overall length of a large diameter assembly. In other applications having a smaller diameter opening and where the length of the conduit 28 is not so critical, the chevron array 20 might be replaced by a cylinder having a high length to diameter ratio as described in U.S. patent application Ser. No. 08/331,170, filed Oct. 28, 1994.

An additional chevron baffle 30 is provided as a shield between the cryogenic array 20 and the diffusion pump 16. The shield 30 is supported on extensions 32 from the conduit 28 through insulators 34.

If the system did not include the baffle 30, the heat flux per cross sectional area from the warm diffusion pump to the cold cryogenic array 20 through the insulating low pressure environment would be as follows:

$$\frac{q}{A} = \frac{\sigma(T_D^4 - T_C^4)}{\frac{1}{\epsilon_D} + \frac{1}{\epsilon_C} - 1} \quad (1)$$

where σ is the Stefan-Boltzmann constant and T and ε are temperature and emissivity of the diffusion pump (D) and cryotrap (C). With the shield 30 interposed between the array 20 and the diffusion pump, the heat flux is dependent on the difference in temperatures between the array and shield as follows:

$$\frac{q}{A} = \frac{\sigma(T_S^4 - T_C^4)}{\frac{1}{\epsilon_S} + \frac{1}{\epsilon_C} - 1} \qquad (2)$$

In a typical system, the cryogenic array is cooled to 107K and the diffusion pump is at about 60° C. or 333K. If the baffles 30 were thermally coupled to the conduit 28 or cooled by ambient temperature cooling water, the temperature of the shield would be about 300K, substantially less than the temperature of the diffusion pump at 333K. Thus, the heat flux to the cryogenic array from the direction of the diffusion pump would be substantially less with the ambient temperature baffle With the baffle 30 thermally insulated from the ambient environment, improved shielding is obtained. The shield 30 floats to an intermediate temperature to balance the heat flux to the baffles 30 from the diffusion pump and the heat flux from the baffles 30 to the cryogenic array 20. If the emissivities of the array 20, baffles 30 and diffusion pump 16 were all equal, that temperature would be defined by the following equation.

$$T_S^4 = 1/2(T_D^4 - T_C^4) \qquad (3)$$

In a particular application having a 107K cryogenic array and 333K diffusion pump, the baffle 30 floats to about 273K. This is a substantial reduction in temperature of the shield 30 from ambient and thus a significant reduction in heat flux to the cryogenic array 20 as compared to the ambient temperature shield. That reduction in heat flux reduces the load on the cryogenic refrigerator 22 and thus allows for a smaller capacity refrigerator.

Figure 2:
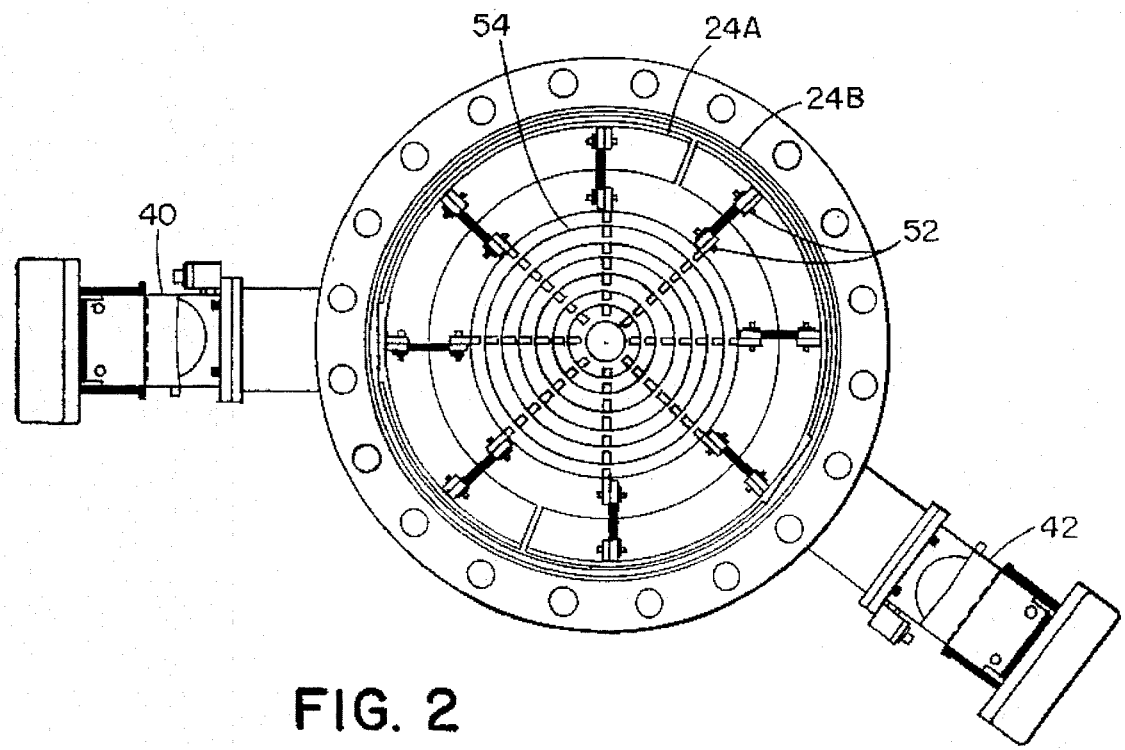
FIG. 2 is a plan view of another embodiment of the invention.
Figure 3:
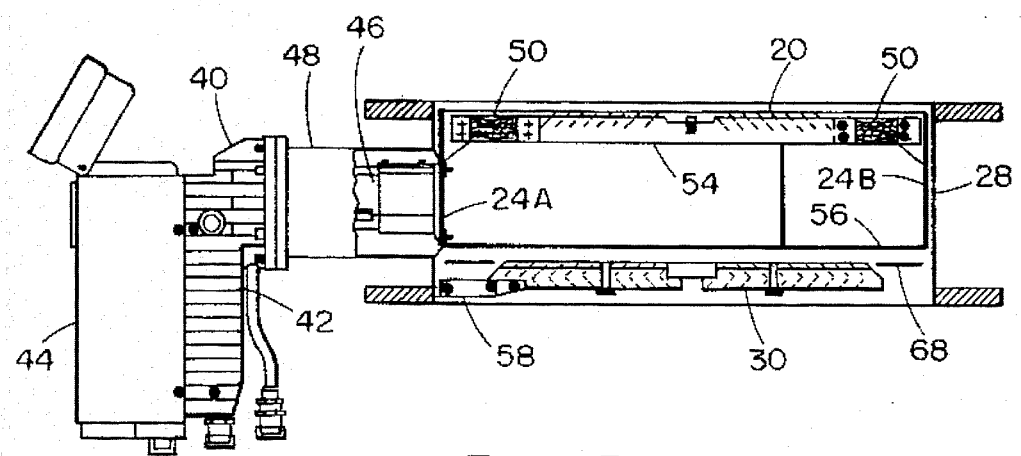
FIG. 3 is a cross sectional view of the embodiment of FIG. 2.

FIGS. 2 and 3 illustrate a particular implementation of the invention. This embodiment was developed for a 21-inch diameter opening to the pumped chamber and was required to handle a high thermal load from the chamber. Accordingly, two model 1050 single stage closed cycle refrigerators 40 and 42 were used to cool the cryogenic trap. But for the use of the floating shield of the present invention, larger refrigerators or more refrigerators would have been required. As illustrated in FIG. 3, each refrigerator includes a motor drive assembly 42 and electronics module 44 for driving a single stage displacer within a cold finger 46. The cold finger extends through a cylindrical housing 48 which is mounted to the conduit 28.

The use of two refrigerators to cool the cryogenic trap presents the difficulty of mounting the cryogenic trap while allowing for thermal contraction of the assembly. Such contraction would cause the trap to pull on each of the refrigerators. Accordingly, the shield 24 of FIG. 2 is formed of two cylindrical sections 24A and 24B, each mounted to a cryogenic refrigerator 40, 42. The cryogenic array 20 is suspended between the cylindrical elements 24A and 24B by copper braid ribbons 50. The ribbons readily stretch to allow for any thermal contraction of the array and outer cylindrical elements. In this embodiment, the braid 50 is fixed to the radial struts 54, which support the chevron baffles, and to the cylindrical elements 24A, 24B by bolts 52.

At the lower end of the cylindrical elements 24A and 24B, a flange 56 extends inwardly to provide additional peripheral trapping.

The shield baffles 30 are suspended from the conduit 28 by insulating straps 58 which preferably are of G-10 fiberglass epoxy laminate. A stainless steel ring 68, shown raised above its normal resting position, rests on the shield 30 to provide peripheral shielding. Alternatively, each baffle array could be extended closer to the conduit 28 to avoid the need for the flange 56 and ring 68.

While this invention has been particularly shown and described with references to preferred embodiments thereof, it will be understood by those skilled in the art that various changes in form and details may be made therein without departing from the spirit and scope of the invention as defined by the appended claims. For example, the invention may be applied to other vacuum pumps such as turbomolecular pumps.

What is claimed is:

1. A cryogenic trap adapted to be positioned between a vacuum pump and a pumped chamber comprising:

a cryogenically cooled array for trapping vapor passing from the pumped chamber to the vacuum pump; and a passive shield positioned between the cryogenically cooled array and the vacuum pump, the shield being insulated from ambient such that the temperature of the shield floats between the temperature of the cryogenically cooled array and the temperature of the vacuum pump.

2. A cryogenic trap as claimed in claim 1 wherein the shield comprises baffles.

3. A cryogenic trap as claimed in claim 2 wherein the cryogenically cooled array comprises baffles.

4. A cryogenic trap as claimed in claim 3 further comprising a cryogenically cooled cylinder for trapping vapor.

5. A cryogenic trap as claimed in claim 4 wherein the cryogenically cooled array is suspended from the cryogenically cooled cylinder by conductive braid.

6. A cryogenic trap as claimed in claim 5 wherein the cylinder is a split cylinder of cylindrical elements thermally coupled to respective cryogenic coolers.

7. A cryogenic trap as claimed in claim 1 wherein the cryogenically cooled array is cooled by a closed cycle refrigerator.

8. A cryogenic trap as claimed in claim 7 further comprising a plurality of refrigerators for cooling the cryogenically cooled array.

9. A cryogenic trap as claimed in claim 8 wherein the cryogenically cooled array comprises a set of baffles suspended by conductive braid from cylindrical elements coupled to respective refrigerators.

10. A cryogenic trap adapted to be positioned between a pumped chamber and a vacuum pump comprising:

a fluid conduit having coupling flanges at each end thereof;

a closed cycle refrigerator mounted to the conduit;

cylindrical elements thermally coupled to respective refrigerators and mounted to provide a narrow cylindrical channel between the conduit and the cylindrical elements;

a cryogenic array of chevron baffles suspended within the cylindrical elements by conductive braid; and a passive shield of chevron baffles positioned between the cryogenic chevron array and the vacuum pump, the shield being insulated from ambient temperature such that the temperature of the shield floats between the temperature of the cryogenic array and the temperature of the vacuum pump.

11. A vacuum pump system for pumping a pumped chamber comprising:

a diffusion pump;

a cryogenic trap between the diffusion pump and the pump chamber, the cryogenic trap comprising:
- a cryogenically cooled array for trapping the vapor passing from the pumped chamber to the vacuum pump; and
- a passive shield positioned between the cryogenically cooled array and the vacuum pump, the shield being insulated from ambient such that the temperature of the shield floats between the temperature of the cryogenically cooled array and the temperature of the vacuum pump.

12. A system as claimed in claim 11 wherein the cryogenically cooled array is cooled by a closed cycle refrigerator.

13. A system as claimed in claim 12 wherein the cryogenically cooled array is a baffle array and the passive shield is a baffle array.

14. A system as claimed in claim 13 wherein the cryogenically cooled array is suspended by conductive braid from separately cooled ring elements.

15. A method of cryotrapping comprising:

condensing vapor passing from a pumped chamber to a vacuum pump on a cryogenically cooled array; and passively shielding the cryogenically cooled array with a shield which is insulated from ambient temperature such that the temperature of the shield floats between the temperature of the cryogenically cooled array and the temperature of the vacuum pump.

16. A method as claimed in claim 15 wherein the pumped chamber is pumped by a diffusion pump.

\* \* \* \* \*